United States Patent
Basso et al.

(10) Patent No.: US 7,904,617 B2
(45) Date of Patent: *Mar. 8, 2011

(54) INDICATING DATA BUFFER BY LAST BIT FLAG

(75) Inventors: Claude Basso, Raleigh, NC (US); Jean Louis Calvignac, Cary, NC (US); Marco C. Heddes, Raleigh, NC (US); Joseph Franklin Logan, Raleigh, NC (US); Fabrice Jean Verplanken, La Gaude (FR)

(73) Assignee: International Business Mahines Corporation, Armonk, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 12/100,739

(22) Filed: Apr. 10, 2008

(65) Prior Publication Data

US 2008/0215772 A1 Sep. 4, 2008

Related U.S. Application Data

(63) Continuation of application No. 11/320,277, filed on Dec. 27, 2005, now Pat. No. 7,412,546, which is a continuation of application No. 09/828,342, filed on Apr. 6, 2001, now Pat. No. 7,200,696.

(51) Int. Cl.
*G06F 5/00* (2006.01)
*G06F 15/16* (2006.01)

(52) U.S. Cl. .......... 710/52; 710/51; 710/54; 710/53; 710/55; 370/365.43; 370/503; 370/395; 370/43

(58) Field of Classification Search .......... 710/51–55; 370/43, 395, 365.43, 503, 603
See application file for complete search history.

(56) References Cited

U.S. PATENT DOCUMENTS

| | | | |
|---|---|---|---|
| 3,732,082 A | 5/1973 | Kolat et al. | |
| 4,126,764 A | 11/1978 | Downey et al. | |
| 4,730,346 A | 3/1988 | Jiang | |
| 4,752,923 A | 6/1988 | Allen et al. | |
| 4,852,088 A | 7/1989 | Gulick et al. | |
| 4,862,451 A | 8/1989 | Closs et al. | |
| 5,375,119 A | 12/1994 | Koivu | |
| 5,625,842 A | 4/1997 | Darymple | |
| 5,694,056 A | 12/1997 | Mahoney et al. | |
| 5,848,068 A | 12/1998 | Daniel et al. | |
| 6,088,355 A | 7/2000 | Mills et al. | |
| 6,157,623 A | 12/2000 | Kerstein | |
| 6,333,938 B1 | 12/2001 | Baker | |
| 6,574,231 B1 * | 6/2003 | Leung | 370/412 |
| 6,654,389 B1 * | 11/2003 | Brunheroto et al. | 370/535 |
| 6,769,055 B1 | 7/2004 | Leung et al. | |
| 6,826,615 B2 | 11/2004 | Barrall et al. | |
| 7,072,347 B2 * | 7/2006 | Calvignac et al. | 370/395.71 |
| 7,130,916 B2 * | 10/2006 | Calvignac et al. | 709/234 |

* cited by examiner

*Primary Examiner* — Tammara Peyton
(74) *Attorney, Agent, or Firm* — Patrick J. Daugherty; Driggs, Hogg, Daugherty & Del Zoppo Co., LPA

(57) ABSTRACT

A method and structure for determining when a frame of information comprised of one or more buffers of data being transmitted in a network processor has completed transmission is provided. The network processor includes several control blocks, one for each data buffer, each containing control information linking one buffer to another. Each control block has a last bit feature which is a single bit settable to "one" or "zero" and indicates when the data buffer having the last bit is transmitted. The last bit is in a first position when an additional data buffer is to be chained to a previous data buffer indicating an additional data buffer is to be transmitted and a second position when no additional data buffer is to be chained to a previous data buffer. The position of the last bit is communicated to the network processor indicating the ending of a particular frame.

9 Claims, 5 Drawing Sheets

INDICATING DATA BUFFER BY LAST BIT FLAG

RELATED APPLICATIONS

This application is a continuation of application Ser. No. 11/320,277, filed Dec. 27, 2005, now U.S. Pat. No. 7,412,546 B2, which is a continuation of application Ser. No. 09/828,342 filed Apr. 6, 2001, now U.S. Pat. No. 7,200,696 B1.

FIELD OF THE INVENTION

This invention relates generally to network processors and, more particularly, to a structure and method for determining when a network processor has completed a frame transmission and, even more particularly, to an efficient utilization of data in a buffer control block for determining the completion of a data transmission in one or more data buffers comprising the frame.

BACKGROUND INFORMATION

When a network processor (NP) transmits frames of information, these frames are generally comprised of a sequence of buffers chained together. Particularly, each buffer contains a space for a predetermined number of bytes of data; for example, a typical number is 64 bytes. This frame constitutes a packet of data to be transmitted as an individual or unitary transmission. The number of individual buffers, typically dynamic RAMS (DRAMs) comprising a packet or frame of information can vary from one to many buffers which have to be chained together. Typically, the chaining together of the necessary data containing buffers is done by buffer control blocks which conventionally are implemented in static RAMS (SRAMs) for speed. However, the bandwidth of static RAMS is limited and this limits the fields that can be used to determine when all of the data containing buffers of the frame has been transmitted. Although the network typically contains a byte count field to count the number of bytes in the frame, this cannot be used for determining the end of a transmission because a frame frequently is altered or modified by the network processor after being received (which is when the byte count is recorded) and before it is transmitted. Recording two byte counts, the original and modified, is costly and time consuming and resource intensive when using static RAMS for implementing the buffer control block. Moreover, while it is possible that the network processor could examine the frame alteration field within a frame buffer to determine if the length of the frame was altered and, if so, by how much, this results in added latency penalty for high performance network processors that access slow dynamic RAMs and adds complexity of a function to be implemented in hardware. Therefore, it is desirable to provide a convenient technique for determining the end of a frame transmission utilizing the information contained within a buffer control block.

SUMMARY OF THE INVENTION

A method and structure for determining when a frame of information comprised of one or more buffers of data being transmitted in a network processor has completed transmission is provided. The network processor includes a plurality of control blocks, one for each data buffer, each containing control information to link one buffer to another for transmission. Each of the control blocks has a last bit feature which is a single bit and indicates when the data buffer having the last bit is transmitted. This last bit feature is a bit which can be set to either zero or one. The last bit feature is in a first position when an additional data buffer is to be chained to a previous data buffer indicating an additional data buffer is to be transmitted, and a second position when no additional data buffer is to be chained to a previous data buffer. The position of the last bit feature is communicated to the network processor to indicate whether the transmission of a particular frame is ended and a new frame is to be transmitted.

DESCRIPTION OF THE PREFERRED EMBODIMENT

Before describing the invention in detail, a brief overview of the functioning of a network processor as it relates to the environment of the present invention is presented to aid in understanding the invention. In a network processor, in which the present invention is utilized, information is transmitted from a remote originating location to a central location in a network processor and then formatted in frames of information to be retransmitted to one or more remote locations that are the receiving locations. The frames of data information are typically comprised of one or more buffers of data, each of which buffers has a finite, known length, e.g. 64 bytes. The transmitted data may contain information that is to be either deleted or modified prior to transmission. Thus, as indicated above, although a byte count is typically made of the number of bytes received from the remote location, the number of bytes transmitted to the receiving locations may be a different number. Also, the number of changed bytes, although they may be recorded, requires manipulation to constitute a measure for determining end of transmission. It is necessary for the network processor to "know when" the transmission is ended so that the network processor can decide which frame is next to be transmitted and bring this frame up for transmission.

According to one scheme of transmitting frames of data comprised of finite length data buffers, buffer control blocks are utilized. These buffer control blocks are utilized to control the sequence of transmission of the data in the frame but are not themselves transmitted. These buffer control blocks are maintained typically in SRAM in what is known as a free queue of the buffer control blocks. When a frame of data is received, a buffer control block is taken from the free queue and associated with one buffer of information in the frame. Each buffer of information in the frame is assigned a control block.

Figure 1:
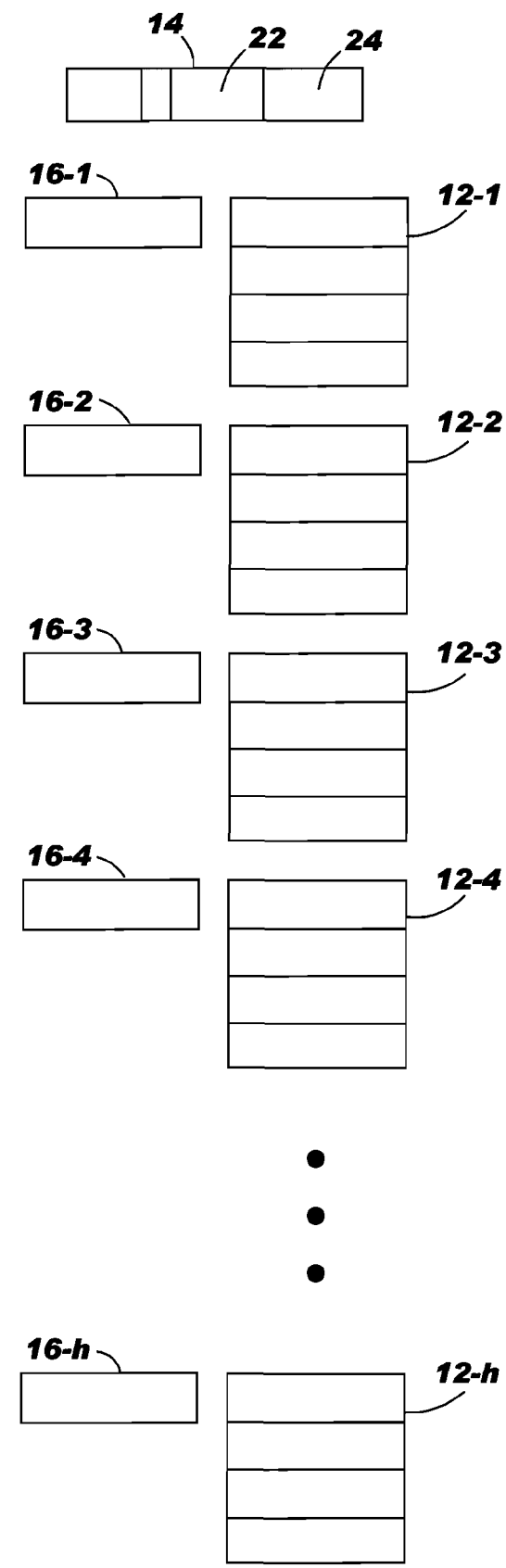
FIG. 1 is a diagrammatic representation of a frame comprised of a plurality of data containing buffers showing how the frame buffer control (FBC) and buffer control blocks (BCB's) are associated therewith for control information.

A frame control block (FCB) is utilized to initiate the transmission of buffers in the frame having a first buffer address (FBA). This technique is shown diagrammatically in FIG. 1 wherein a frame of data 10 is shown which is comprised of a plurality of data buffers 12-1, 12-2, 12-3, 12-4, . . . 12-n. It is to be understood that in some cases but a single data buffer would be utilized, i.e. that is all the space that is required for the data being transmitted. However, in many cases, more than one data buffer is required and, hence, these must be transmitted together sequentially as a unit. Also, the data in each of the buffers must be accurately located as to the starting and stopping position for the reading of the data and transmission of the read data especially in data buffer 12 which has been modified.

To start the transmission of a frame, a frame control buffer (FCB) 14 is provided and buffer control blocks 16-1, 16-2, 16-3, 16-4, . . . 16-n are provided which are associated with each of the data buffers 12-1-12-n. The frame control buffer starts the operation of reading the information from the frame 10 by providing a frame buffer address which will indicate which buffer from the free buffer queue list (FQL), as will be described presently, is to be associated with the first data buffer 12-1. The frame control buffer 14 also contains a parity bit, a starting buffer address 22 and an end buffer address 24, which are, respectively, the starting address in the buffer 12-1 and the end buffer address also in buffer 12-1.

Figure 2:
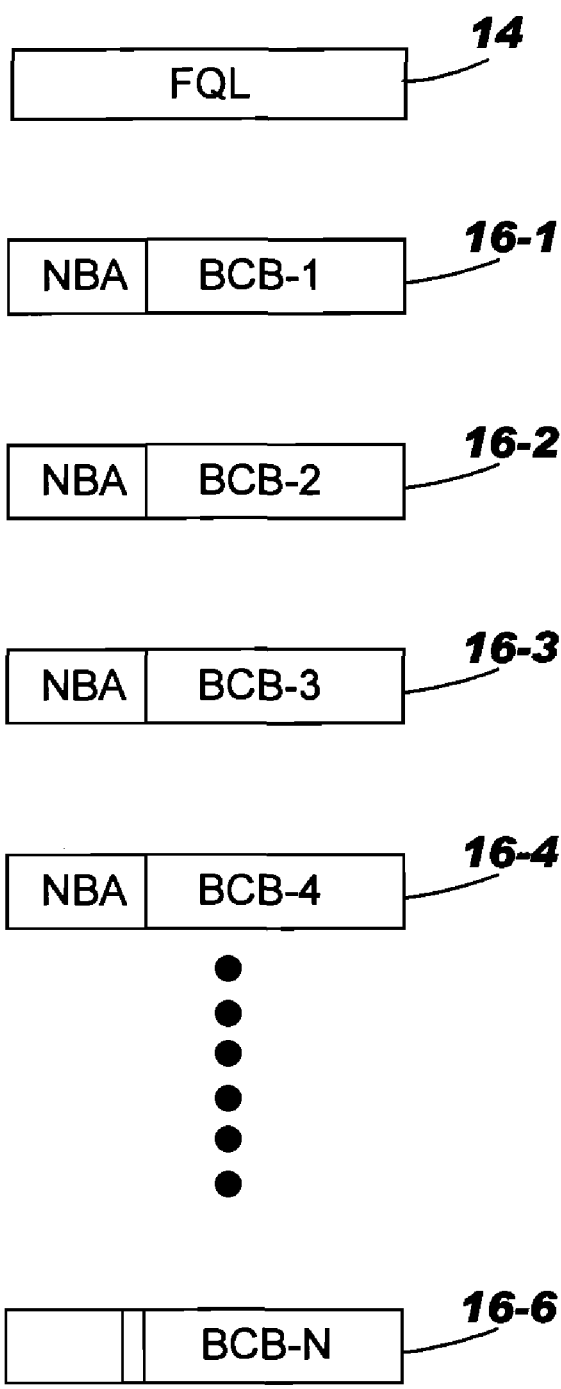
FIG. 2 is a diagrammatic representation of buffer control blocks which are in the free queue.
Figure 3:
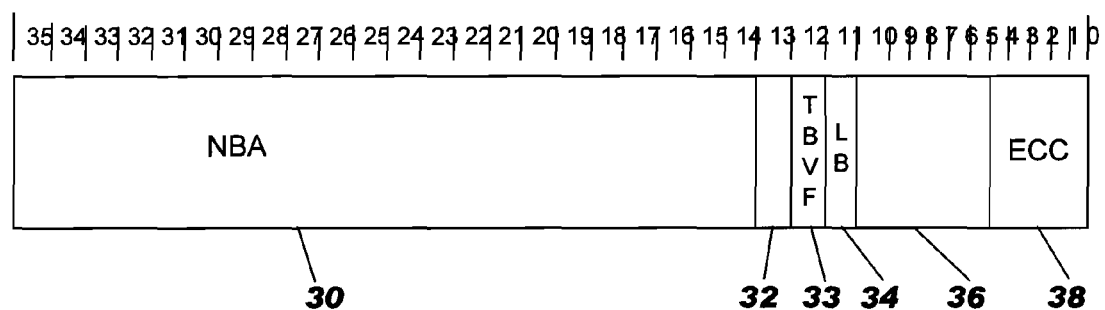
FIG. 3 is a diagrammatic representation of the spaces being used in each buffer control block in the free queue.
Figure 4:
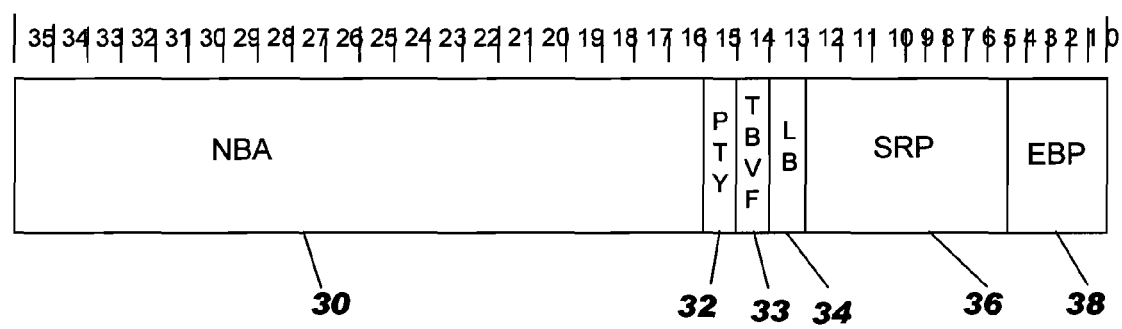
FIG. 4 is a diagrammatic representation of the spaces used in a buffer control block when it is being utilized to control the transmission of information from a frame comprised of one or more buffers of data information.

The buffer control block buffers in the free buffer queue are shown diagrammatically in FIG. 2. The free buffer queue list is no more than an indication of which buffer control blocks 16-1-16-n are associated with data buffers 12-1 through 12-n and are not already in use. The various fields of information contained in a buffer in the free buffer queue are shown in FIG. 3. As seen in FIG. 3, each buffer control block 16 includes a space 30 in which the next buffer address (NBA) is contained, a blank space which is one bit wide 32, the purpose of which will be indicated later, a blank space 33 which is also one bit wide, the purpose of which also will be described later but which is not related to this invention, a space 34 which is one bit wide and which is a flag bit, often referred to as a last bit (LB), to indicate that either the last bit will occur in that buffer or whether more buffers are to be utilized in conjunction with data buffer 12-1-12-n, in a way which will be described presently. A blank space 36 and a space 38 are provided, which space 38 contains error correction code (ECC) to correct the address of the next buffer address if there are any mistakes contained in space 30. As will be described presently, error correction code (ECC) resides in space 38 but only while the control block buffer is in the free buffer queue as shown in FIG. 2. The ECC will assure that the proper next buffer address is contained in the buffer control blocks 16-1-16-n. Also, whenever a buffer control block buffer 16 is in the free buffer queue, the last bit or flag bit space 34 is set to a one.

Once the frame control buffer 14 has selected an address for initial data buffer 12-1, the buffer control block 16-1 is assigned to this specific data buffer 12-1. The frame control buffer 14 has stored therein, as indicated earlier, the starting buffer address 22 from the buffer 12-1 that is being used and the end buffer address 24, also from the buffer 12-1 is being used. The buffer control block 16-1 assigned to the data buffer 12-1 then has written therein a parity bit in space 32 and a transient buffer designation in space 33. (This transient buffer is not a part of the invention so it will not be discussed further.)

The starting address or start byte position (SBP) for the next buffer control block 16-2 (which corresponds to the starting address of the next data buffer 12-2) is written in space 36. The end address or end byte position (EBP) for the data and data buffer 12-2 is then written in space 38 (which previously contained the error correction code) and the last bit flag bit in space 34 is flipped from one to zero, indicating that there is data to be read from the data buffer 12-2. This sequence continues through buffer control block 16-2 associated with data buffer 12-2, buffer control block 16-3 associated with data buffer 12-3, buffer control block 16-4 associated with data buffer 12-4 through the last buffer control block 16-n associated with data buffer 12-n.

Let us take as an example a case where there is data contained within data buffers 12-1, 12-2, 12-3 but none in 12-4, the data ending in data buffer 12-3. In such case, the blanks 36 in control block 16-1 would be written with the starting address of the data in data buffer 12-2 and the space 38 would be written with the end address of the data in data buffer 12-2. The space 36 in buffer control block 16-2 would be written with the starting address of the data in data buffer 12-3 and the space 38 would be written with the ending address of the data contained in data buffer 12-3. In each of these cases, the bits in the last bit space 34 would be flipped to zero. However, with respect to the information written in data control block 16-3, since there is no data contained in frame buffer 12-4, no starting address would be listed in space 36 and ending address in space 38, thus indicating that there is indeed no further data buffers containing information and that data buffers 12-1, 12-2 and 12-3 contain all of the information. Since no starting and ending addresses for data buffer 12-4 are found in spaces 36 and 38 of buffer control block 16-3, the space 34 would contain a bit "one" rather than "zero" since it would not be flipped as no addresses were written. Since this buffer control block 16-3 shows a last bit indication of a one, which information is transmitted to the network processor, the processor "knows" that data buffer 12-3 is the last data buffer that has to be transmitted and can then start queuing the next frame for transmission. The buffer control blocks all have their last bits in space 34 flipped and then buffer control blocks 16-1 to 16-3 are returned to the free buffer control block queue.

If there is data only in the first data buffer 12-1, then the buffer control block 16-1 will contain no starting address or finishing address, and the buffer control block will be returned to the free queue. (The flipping of the last bit control bit is not required since it is already at "one").

Figure 5:
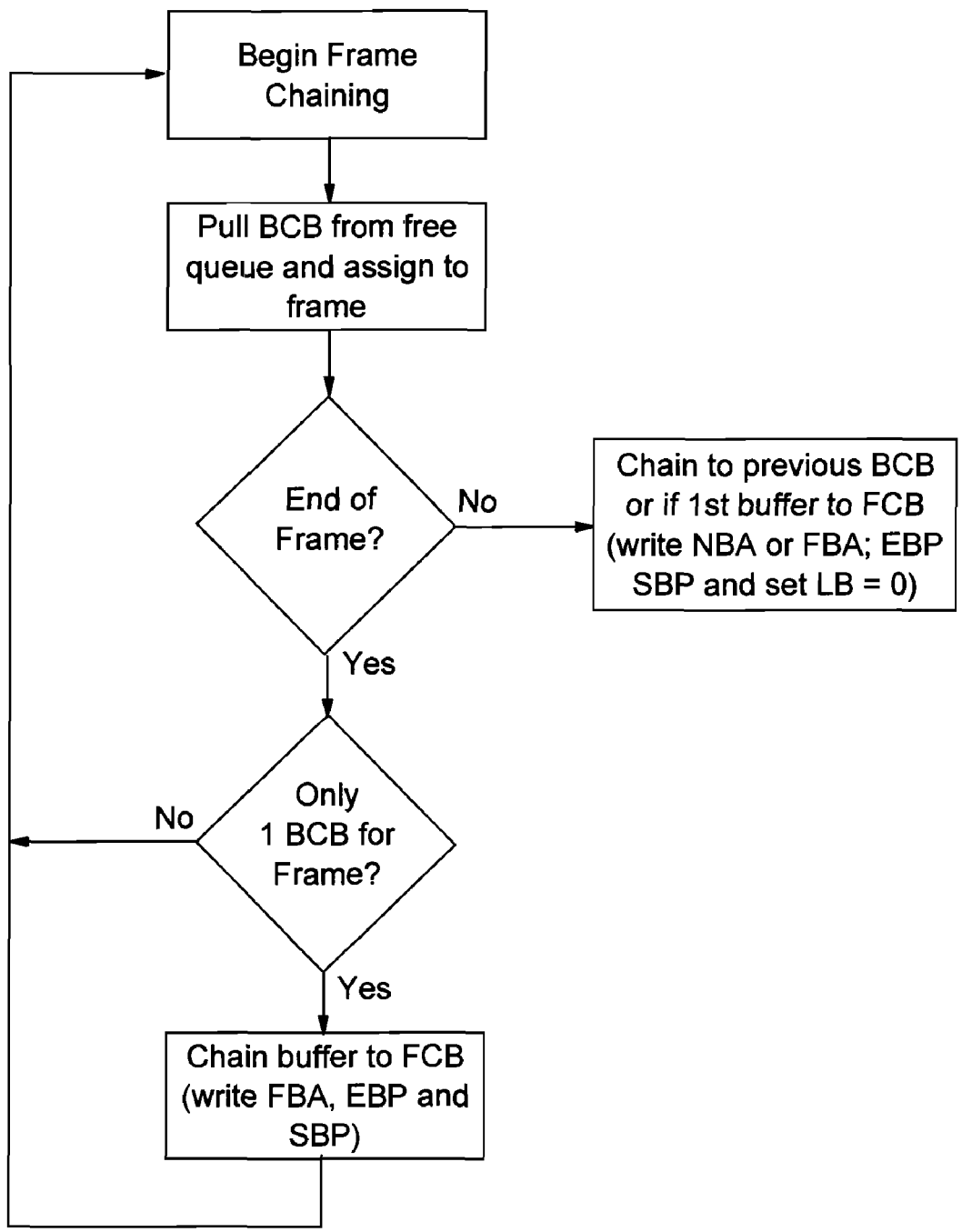
FIG. 5 is a flow chart of the operation of the invention.

FIG. 5 shows a flow chart for the operation of the invention, and is self-explanatory.

Certain important features of this invention include an optimized way to indicate the last buffer in a list of chained buffers based on "remembering" that a buffer came from the free queue. A "last bit" is set to "one" in BCB when releasing a buffer, i.e. enqueueing it in the free queue. When a buffer is leased, i.e. dequeued from the free queue, it comes with its "last bit" set to "one" in the BCB. When a leased buffer is chained to the end of a list of buffers in a frame, its "last bit" is not changed from "one" because its BCB is not written (there is no BCB after this last BCB in the list of buffers). The "last bit" of the buffer which was at the end of the list is reset because the BCB is written to point to the new last buffer (the leased one). The set and reset operations on the "last bit" are free in terms of memory bandwidth because they are included in read or write accesses needed to get or update the next BCB pointer when dequeueing or enqueueing.

Accordingly, the preferred embodiment(s) of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A method that determines when the transmission of a frame of data over a network is complete, comprising:
   a network processor comprising a plurality of buffer control blocks, one for each of a plurality of data buffers, controlling a transmission of a frame of data by:
   receiving a frame of data;
   storing the frame of data in the plurality of data buffers;
   providing one each of the plurality of control blocks for each of the plurality of data buffers, wherein each of the control blocks includes:
      a first field that provides space for a start address of a next data buffer;
      a second field that provides space for an end address of the next data buffer; and
      a third field that provides space for a flag that indicates whether the data buffer is to be linked to the next data buffer;
   initially setting the flag of each of the control blocks to indicate that a corresponding data buffer is not linked to another data buffer;
   toggling the flag to indicate that the corresponding data buffer is to be linked to the next data buffer when the first and the second fields respectively include the start address and the end address; and
   determining when the transmission of the frame is complete based on the state of the flag.

2. The method of claim 1, wherein transmission of the frame of data is determined to be complete when the flag of one of the data buffers indicates that the one of the data buffers is not linked to another data buffer, and further comprising the network processor queuing the next frame of data for transmission when transmission of the frame of data is complete.

3. The method of claim 2, further comprising the network processor returning the control blocks to a free buffer control block queue when transmission of the frame of data is complete.

4. A method for determining when a transmission of a frame of data over a network is complete, the method comprising:
   providing a network processor comprising a plurality of buffer control blocks, one for each of a plurality of data buffers, wherein each of the control blocks includes a first field that provides space for a start address of a next data buffer, a second field that provides space for an end address of the next data buffer and a third field that provides space for a flag that indicates whether a data buffer is to be linked to the next data buffer, the network processor to control a transmission of data by:
   initially setting the flag of each control block to a first position to indicate that a corresponding data buffer is not linked to another data buffer; and
   toggling the flag of each control block to a second position that is different from the first position to indicate that the corresponding data buffer is to be linked to the next data buffer when the first and the second fields respectively include the start address and the end address.

5. The method of claim 4, wherein transmission of a frame of data is determined to be complete when the flag of one of the data buffers indicates that the one of the data buffers is not linked to another data buffer.

6. The method of claim 5, further comprising the network processor queuing the next frame of data for transmission when transmission of the frame of data is complete.

7. The method of claim 5, further comprising the network processor returning the control blocks to a free buffer control block queue when transmission of a frame of data is complete.

8. The method of claim 4, wherein the control blocks are in a free buffer control block queue when not in use in conjunction with a data buffer and the flag is in the first position when in the free buffer control block queue.

9. The method of claim 8, wherein the buffer control blocks are chained in a given order when in the free buffer control block queue.

\* \* \* \* \*